No. 11,915. Reissued June 25, 1901.

J. F. BARKER.

WATER SUPPLY SYSTEM.

(Application filed May 25, 1901.)

Witnesses

C. F. Kilgore

F. M. Bragg

Inventor

John F. Barker by Simonds & Hart

Attorneys

THE NORRIS PETERS CO., PHOTO-LITHO., WASHINGTON, D. C.

UNITED STATES PATENT OFFICE.

JOHN F. BARKER, OF SPRINGFIELD, MASSACHUSETTS.

WATER-SUPPLY SYSTEM.

SPECIFICATION forming part of Reissued Letters Patent No. 11,915, dated June 25, 1901.

Original No. 669,719, dated March 12, 1901. Application for reissue filed May 25, 1901. Serial No. 61,972.

*To all whom it may concern:*

Be it known that I, JOHN F. BARKER, a citizen of the United States of America, residing at Springfield, in the county of Hampden and State of Massachusetts, have invented a certain new and useful Improvement in Water-Supply Systems, of which the following is a description, reference being had to the accompanying drawings, wherein—

Figure 1:
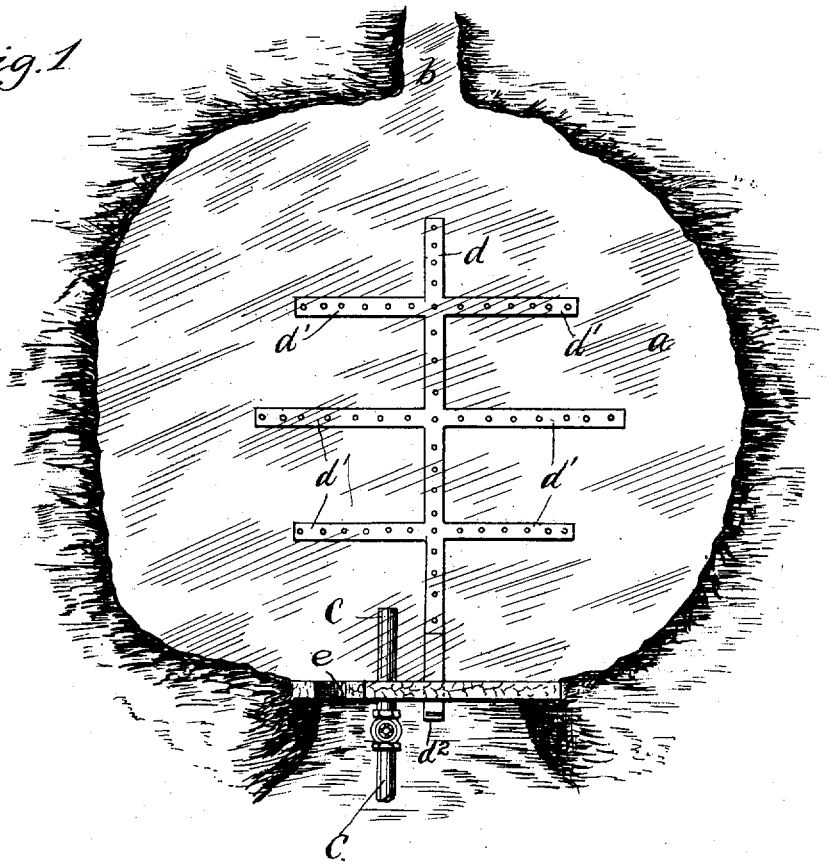
Figure 2:
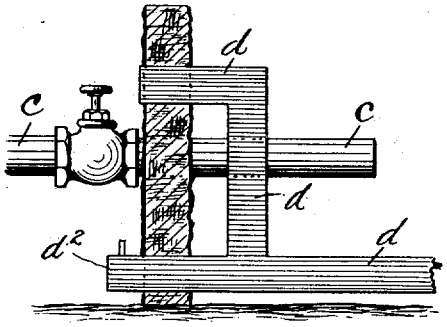
Figure 3:
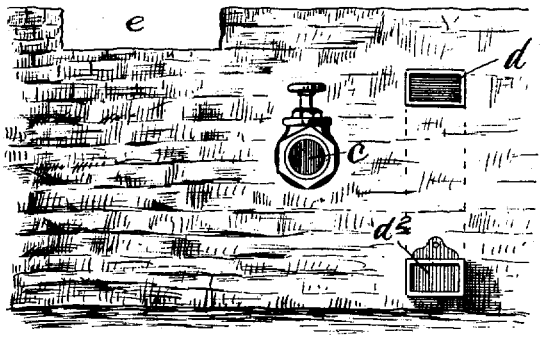

Figure 1 is a plan view of a reservoir embodying said improvement. Fig. 2 is a side elevation view, cutting the dam in vertical cross-section, showing the forward part of the waste outlet-pipe and a section of the outlet supply-pipe. Fig. 3 is a face view of that portion of the dam which comprehends the outlet supply-pipe, the waste outlet-pipe, and the additional waste-outlet.

The object of the improvement is the production of a reservoir for a municipal water-supply or the like in which the waste or surplus water is taken from near the bottom of the reservoir, with certain advantageous results.

In the ordinary construction of ponds or reservoirs forming part of a municipal water-supply the waste water flows away from the surface over a dam provided for that purpose. Water at a temperature of 39° Fahrenheit is at its maximum density, and as its temperature falls below that point its density decreases until it congeals, and the ice which is formed in the congealing floats on the surface of the water. Such ponds or reservoirs as those referred to are largely replenished during the months of late fall, winter, and early spring with water that is cold and pure and which on account of its less specific gravity forms the upper part of the body of water in the reservoir, and from that portion of the water all surplus runs to waste over the top of a dam, leaving the warmer and heavier water undisturbed and stagnant below it, the practical result being that it is pure fresh water that is wasted and stagnant water, ofttimes foul, that is kept in store. This construction of ponds and reservoirs, so common in the past, is one that practically leaves a body of water at the bottom of the pond undisturbed for considerable periods of time, giving an opportunity meanwhile for the generation and growth therein of organisms which are detrimental to its purity and also giving opportunity for the collection at the bottom of the pond of substances which are also detrimental to the purity of the water, substances likely to come into the water either by the act of man or of the lower animals or of nature.

It is a prime object of the present improvement to remove as waste so much of the water from the pond as equals the surplus which flows in, thus preserving and storing fresh water by getting rid of the stagnant water at the bottom of the pond, the effect being the same as though the reservoir were at stated intervals emptied and refilled with fresh water.

In the accompanying drawings the letter *a* denotes a pond or reservoir, *b* denotes an inlet through which water flows into this reservoir, and *c* denotes an outlet supply-pipe for taking water for drinking or other purposes to the consumers. The water flows into and through the outlet supply-pipe *c* through gravity.

The letter *d* denotes a waste outlet-pipe, which has lateral branches *d'*, the pipe and its branches being perforated to permit the inflow of water. The intake part of this waste outlet-pipe is situated below the outlet supply-pipe and near the bottom of the reservoir. Near its front or delivery end it rises to a higher point, so that it finally delivers the waste water at a higher point than its intake and also at a higher point than the intake of the outlet supply-pipe.

The letter *e* denotes an additional outlet of the reservoir.

In practical operation and in ordinary times the waste outlet-pipe *d* is designed to be ample in size for the discharge of all surplus as waste. The additional waste-outlet *e* is provided as a safeguard for use in times of flooding by rains or melting snow or the like. The waste outlet-pipe *d* is provided with a draw-off pipe $d^2$ for use when it is desired to draw off substantially the entire contents of the reservoir. This draw-off pipe $d^2$ may also be used to draw off the lower stratum of water in the reservoir to any desired degree when, for instance, water is not high enough in the reservoir to reach the delivery end of the outlet-pipe *d*. The perforated pipe *d* with its perforated branches *d'* constitute a system of perforated outlet-pipes which in ordinary use and action exert a withdrawing influence on the stratum of water in which such perforated pipes are located, extending over a substantial part of the area of the bottom of the reservoir, and by "substantial part" is meant one-third or more of the area of the bottom of the reservoir. In case of a long narrow reservoir a single perforated pipe would answer the purpose of and be the equivalent for such a branch system as that shown in the drawings.

I claim as my improvement—

1. In combination, the reservoir, the inlet adapted for the flow of water into the reservoir, the outlet supply-pipe and the waste outlet-pipe adapted to take water from below the outlet supply-pipe, and through gravity deliver it from the reservoir at a higher point, all substantially as described and for the purposes set forth.

2. In combination, the reservoir, the inlet adapted for the flow of water into the reservoir, the outlet supply-pipe, and a waste-outlet located below said supply-pipe and connected to a system of perforated outlet-pipes located below said supply-pipe and within the reservoir and adapted when the waste-outlet is open to exert a withdrawing influence on the stratum of water in which such perforated pipes are located and over a substantial part of the area of the bottom of the reservoir.

JOHN F. BARKER.

Witnesses:
W. T. RAYNER,
L. E. DRAPER.